UNITED STATES PATENT OFFICE.

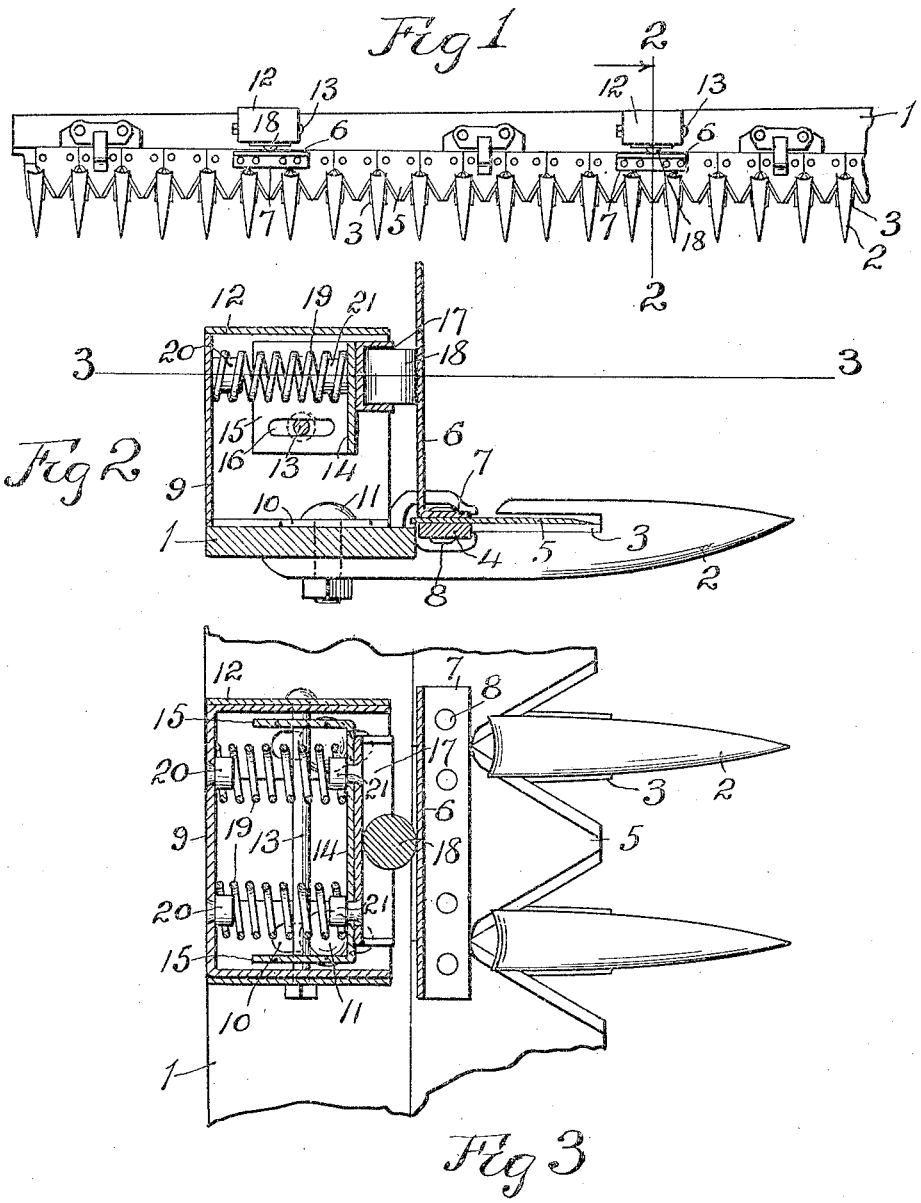

GEORGE H. HAYES, OF HAZELTON, KANSAS.

SICKLE ATTACHMENT.

1,326,339.  Specification of Letters Patent.  Patented Dec. 30, 1919.

Application filed May 24, 1918. Serial No. 236,276.

*To all whom it may concern:*

Be it known that I, GEORGE H. HAYES, a citizen of the United States, residing at Hazelton, in the county of Barber and State of Kansas, have invented a certain new and useful Improvement in Sickle Attachments, of which the following is a specification.

My invention relates to improvements in sickle attachments.

The object of my invention is to provide a sickle attachment of novel construction, by means of which the sickle blades of the cutter bar of a mower or reaper will always be yieldingly held in shearing engagement with the ledger plates or blades of the finger bar.

My invention provides further novel means for reducing friction in the movement of the sickle bar.

My invention provides still further a novel construction by which the spring pressure, which is exerted to hold the knives of the sickle bar in shearing engagement with the ledger plates, will be greatest when the sickle bar is at the middle of its stroke, and which reduces as the sickle bar passes from the middle to the ends of its stroke.

My invention provides further an attachment of the kind described which is simple in construction, cheap to manufacture, strong and durable, not likely to get out of order, and which can be easily repaired.

The novel features of my invention are hereinafter fully described and claimed.

In the accompanying drawing, which illustrates the preferred embodiment of my invention, Figure 1 is a plan view of a portion of a finger bar and of a portion of a sickle bar, which are provided with my improved attachment.

Fig. 2 is an enlarged cross section on the line 2—2 of Fig. 1.

Fig. 3 is a horizontal section on the line 3—3 of Fig. 2.

Similar reference characters designate similar parts in the different views.

1 designates an ordinary finger bar of a mower provided with the usual fingers 2, on which are mounted the usual lower blades or ledger plates 3.

4 designates an ordinary cutter bar reciprocatively mounted in the usual manner on the finger bar 1 and which is provided with the usual cutter blades 5 which coöperate in the usual manner with the ledger plates 3.

As ordinarily constructed, the cutter or sickle blades 5 do not at all times have a close shearing engagement with the ledger plates 3, thus permitting clogging of the machine and reducing its efficiency.

My invention has for its object the holding of the cutter blades 5 yieldingly in close shearing engagement with the ledger plates 3. To effect this result, I provide on the cutter bar 4 a bearing comprising a vertical bearing member or plate 6, which is disposed with its rear bearing surface parallel with the line of travel of the cutter bar 4, and which is secured to the cutter bar by means of a horizontal longitudinal flange 7, which is provided at the lower edge of the bearing member 6, and which is secured to the upper sides of some of the blades 5 by means of rivets 8, which extend through said blades and through the cutter bar 4. Two such bearing members 6 are preferably provided, as shown in Fig. 1, the plates being disposed intermediate of the ends of the cutter bar.

Two mechanisms are provided on the finger bar 1 for exerting a yielding forward pressure against the rear sides of the bearing members 6, thereby forcing the blades 5 downwardly against the ledger plates 3, and also forcing the cutter bar 4 forwardly out of contact with the finger bar 1.

As both of these mechanisms which are mounted on the finger bar are alike, a description of one will suffice for both.

Secured to the upper side of the finger bar 1 at the rear of the adjacent bearing member 6 is a support which comprises, preferably, a metal box 9, which in its bottom is provided with transverse slots 10, through which extend vertical bolts 11, which extend through and are secured to the finger bar 1. This arrangement permits the box 9 to be adjusted forwardly and backwardly to the proper position, when it is mounted on a finger bar of a machine which is already in use.

The front of the box 9 is open, and the box has an open top which is preferably normally closed by means of an inverted U-shaped cover 12, which is held in position by means of a longitudinal horizontal bolt 13, which extends through the ends of the box 9.

In the box 9 is mounted a presser member 14, which at its ends is provided with two rearwardly extending arms 15, each provided with a transverse horizontal slot 16, through which extends the bolt 13, on which the presser member is forwardly and backwardly slidable. The length of the presser member 14 is less than the inside length of the box 9, so that the presser member is also adapted to have a horizontal pivotal movement on the bolt 13, for the purpose hereinafter explained.

The forward side of the presser member 14 is provided with a longitudinal channel 17, preferably closed at its ends and having mounted in it a roller 18, having a vertical axis, and which has preferably, traveling engagement with the forward side of the presser member 14 and with the rear side of the bearing member 6.

For yieldingly forcing the presser member 14 forwardly toward the bearing member 6 and to transmit pressure to the bearing member through the roller 18, I provide resilient means which, preferably, exerts a spring pressure against the rear side of the presser member 14 at two points between which the roller 18 travels. For providing this spring pressure at two points, I provide, preferably, two horizontal coil springs 19, which are disposed in the same horizontal plane and which at their rear ends bear against the inner side of the rear of the box 9, and which at their forward ends bear against the rear side of the presser member 14, as shown in Fig. 3.

For holding the springs 19 in their proper position, the rear ends of the springs respectively encircle two buttons 20, which are secured to the rear and inner side of the box 9. The forward ends of the springs respectively encircle two buttons 21, which are secured to the rear side of the presser member 14.

In the operation of my invention, when the cutter bar 4 is reciprocated, the spring pressure of the presser member 14 against the roller 18, will cause the bearing member 6 to be forced forwardly, thus forcing the blades 5 tightly against the ledger plates 3, and at the same time forcing the cutter bar 4 forwardly out of tight engagement with the finger bar 1. The blades 5 thus always have a close shearing engagement with the ledger plates 3, and the friction of the cutter bar 4 against the finger bar 1 is eliminated, or very much reduced.

As the cutter bar reaches the middle of its stroke and is in the position shown in Fig. 3, both springs 19 will be compressed alike, the roller 18 being midway between the bearing points of the springs. The greatest pressure will thus be transmitted from the presser member 14 through the roller 18 and against the bearing member 6, when the cutter bar 4 is at the middle of its stroke. When the cutter bar 4 moves in either direction from the central position, the spring 19 which is farthest from the roller 18 will expand, and will not exert as great a pressure as it does when the sickle bar is in the middle position. Thus, when the cutter blades have the most work to do, the spring pressure for holding the blades against the ledger plates will be the greatest.

I do not limit my invention to the structure shown and described, as modifications, within the scope of the appended claims, may be made without departing from the spirit of my invention.

What I claim is:

1. The combination with a finger bar and a reciprocative cutter bar, of a bearing on the cutter bar, a presser member on the finger bar, a roller engaging the bearing and the presser member, and two springs for forcing the presser member toward the bearing and between which the roller travels.

2. The combination with a finger bar and a reciprocative cutter bar, of a bearing on the cutter bar, a presser member on the finger bar, a roller engaging the bearing and the presser member, the presser member being slidably and pivotally movable on the finger bar, and resilient means which permits pivotal movement of the presser member for slidably forcing the presser member toward the bearing.

3. The combination with a finger bar and a reciprocative cutter bar, of a vertical bearing member secured to the cutter bar, a support carried by the finger bar, a presser member slidably and pivotally mounted on said support and having a channel disposed parallel with the path of movement of the cutter bar, a roller mounted in said channel and having traveling engagement with said two members, and yielding means for normally forcing the presser member toward the bearing member.

4. The combination with a finger bar and a reciprocative cutter bar, of a vertical bearing member secured to the cutter bar, a support carried by the finger bar, a presser member slidably and pivotally mounted on said support and having a channel, two springs which engage the presser member at two points and normally force the presser member toward the bearing member, and a roller mounted in said channel and having traveling engagement between said points with the presser member and having a bearing against said bearing member.

5. The combination with a finger bar and a reciprocative cutter bar, of a vertical bearing member secured to the cutter bar, a box mounted on said finger bar and having an opening in the side adjacent to the bearing member, a presser member having in its forward side a longitudinal channel and provided with two rearwardly extending arms, each having a horizontal slot extending transversely to the finger bar, a rod extending lengthwise through and supported by said box and extending through said slots and slidably and pivotally supporting the presser member, two coil springs in said box bearing at two points respectively at the rear side of said presser member, and a roller in said channel and having traveling engagement with the presser member intermediate of said two points and having a bearing against said bearing member.

In testimony whereof I have signed my name to this specification.

GEORGE H. HAYES.